May 15, 1962    F. W. COPLESTON ET AL    3,035,158
ELECTRIC ARC WELDING
Filed May 7, 1959
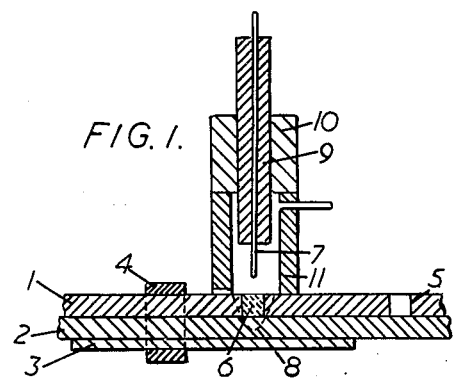
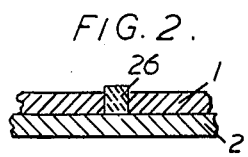 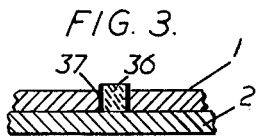
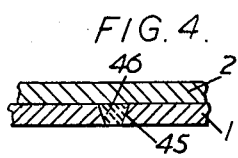
*Inventor*
FRANCIS WILLIAM COPLESTON
LEONARD MARK AUGUSTUS GOURD
By
Aaron R. Townsend *Attorney*

3,035,158
ELECTRIC ARC WELDING
Francis William Copleston, Finchley, London, and Leonard Mark Augustus Gourd, London, England, assignors to The British Oxygen Company Limited, a British company
Filed May 7, 1959, Ser. No. 811,629
Claims priority, application Great Britain May 14, 1958
1 Claim. (Cl. 219—127)

This invention relates to electric arc welding and more particularly to the welding together of overlapped metal members, particularly sheets, by the process in which an electric arc is struck between one of the members and a relatively non-consumable electrode.

Difficulties have been experienced in applying this process to the welding of certain metals, such as unkilled mild steel and heat resisting steel, owing to porosity in the weld or to weld cracking and/or cratering. It is an object of the present invention to provide a method of welding and means whereby welds of improved quality may be produced in such materials.

According to the present invention there is provided in the gas shielded electric arc spot welding of overlapped metal members which are in contact over a common interface by means of an electric arc established between one of the members and a relatively non-consumable electrode, the steps of inserting a preformed metal body having a composition appropriate to that of the overlapped metal members in an aperture which is formed in the first of the members and extends to the common interface, supplying a shielding gas to flow around the electrode and over the weld zone, striking an arc between the electrode and the preformed body or the first member adjacent the preformed metal body, and maintaining this arc until the preformed body and metal of the members adjacent the preformed metal body is completely fused into a weld nugget extending through the common interface wherein at least one of the overlapped metal members is of unkilled mild steel and the metal of the preformed body is killed mild steel.

A feature of the invention is the provision of a preformed metal body for use in this method. The preformed body and aperture will generally be of corresponding shape and are preferably cylindrical. However, they may be frusto-conical for example, or of other shape allowing insertion of the preformed body from one side only of the first member.

In some cases the preformed body will consist of a metal having a different composition or different physical condition to that of one or both of the members to be welded together. This aspect of the invention is useful where the composition of one or both of the members normally renders good welding difficult or impossible, the metal of the preformed body being selected to dilute the weld metal to a desired extent. Thus, for example, where two overlapped sheets of unkilled mild steel are to be spot welded together a cylindrical aperture in the first of the sheets is filled with a preformed body of killed mild steel. Welding is effected as described below and results in a weld of improved quality as compared with that obtainable with unkilled mild steel alone.

In some cases it may be desired to prevent cratering and attendant cracking of the weld when spot welding two overlapped metal sheets. The preformed body may then contain more metal than would be needed to fill the aperture in the first sheet. The metal of the preformed body may be identical to that of the first or second members but, for some applications, it may be in a different physical condition.

The preformed body may include or may be coated with a material having a beneficial effect on the weld such as a deoxidiser, arc stabiliser, or a flux. The preformed body may include or consist of sintered metal powder.

The invention will now be described by way of example with reference to the accompanying diagrammatic drawing in which:

FIGURE 1 shows a sectional view of two overlapped metal sheets arranged for spot welding by an electric arc torch, one form of preformed body being shown in position for welding; and FIGURES 2, 3 and 4 show alternative forms of preformed body positioned for welding in overlapped metal sheets.

Referring to FIGURE 1 of the drawing, two metal sheets 1 and 2, each having a thickness of less than a quarter of an inch, are shown clamped in overlapping relationship to a metal backing bar 3. One clamping device for this purpose is shown diagrammatically at 4. The first sheet 1 is formed with a series of apertures 5, by drilling or punching for example, and this sheet is laid on top of the second sheet 2. A preformed body 6 of suitable welding metal is disposed in each of the apertures 5, and each of the preformed bodies 6 is then fused, either simultaneously or successively into a weld joining the sheets 1 and 2 by means of an electric arc struck between the preformed body 6 or the first sheet 1 adjacent to the aperture and a relatively non-consumable electrode 7 such as tungsten. The desired cross-section of fused metal is indicated at 8.

The electrode 7 is mounted in an electric arc torch of conventional type for electric arc spot welding, an electrode support 9 being carried by a torch body 10 and spaced a predetermined distance from the sheet 1 by a cylindrical nozzle 11. The welding cycle is of predetermined limited duration, and a shielding gas, such as argon, is supplied to the nozzle 1 during the welding cycle to surround the electric arc and protect the heated weld metal. Either direct or alternating welding current may be used.

It will be noted that in FIGURE 1, the preformed body 6 is cylindrical and fills the aperture 5. In FIGURE 2 is shown a preformed body 26 which contains more metal than is needed to fill the aperture 5. This form of preformed body may be used where weld cratering or cracking might otherwise occur.

FIGURE 3 shows a preformed metal body 36 having a coating 37 of a material having a beneficial effect on the weld, such as a deoxidiser, arc stabiliser, or a flux. This form of preformed body may be preferred for some applications.

If the apertures and the preformed bodies are of frusto-conical or other shape so that the preformed bodies cannot pass through the apertures in one direction then positional welding, for example vertical welding, may be effected. FIGURE 4 shows a preformed body 46 of frusto-conical shape inserted in an aperture 45 of corresponding shape. With the sheet 1 beneath the sheet 2, spot welds may be made with an electric arc torch directed upwardly against the underside of sheet 1.

It will be appreciated that the invention may be applied to the welding of a sheet to a member not of sheet form. Thus a metal sheet intended to form part of the skin of a high speed aircraft may be welded to a stiffening rib, possibly of different material, by the method hereinbefore described.

We claim:

In the gas shielded electric arc spot welding of overlapped metal members which are in contact over a common interface by means of an electric arc established between one of the members and a relatively non-consumable electrode, the steps of inserting a preformed metal body having a composition appropriate to that of the overlapped metal members in an aperture which is formed in the first of the members and extends to the common interface, supplying a shielding gas to flow around the electrode and over the weld zone, striking an arc between the electrode and the preformed body or the first member adjacent the preformed metal body, and maintaining this arc until the preformed body and metal of the members adjacent the preformed metal body is completely fused into a weld nugget extending through the common interface wherein at least one of the overlapped metal members is of unkilled mild steel and the metal of the preformed body is killed mild steel.

References Cited in the file of this patent

UNITED STATES PATENTS

| | | |
|---|---|---|
| 1,034,290 | Parish | July 30, 1912 |
| 1,313,387 | Kaarbo | Aug. 19, 1919 |
| 2,467,516 | Almdale | Apr. 19, 1949 |

FOREIGN PATENTS

| | | |
|---|---|---|
| 12,984 | Great Britain | Oct. 28, 1885 |